April 8, 1941.  J. R. SNYDER  2,237,318
DIRECT ACTING FRICTION SHOCK ABSORBER
Filed Sept. 17, 1938  2 Sheets-Sheet 1
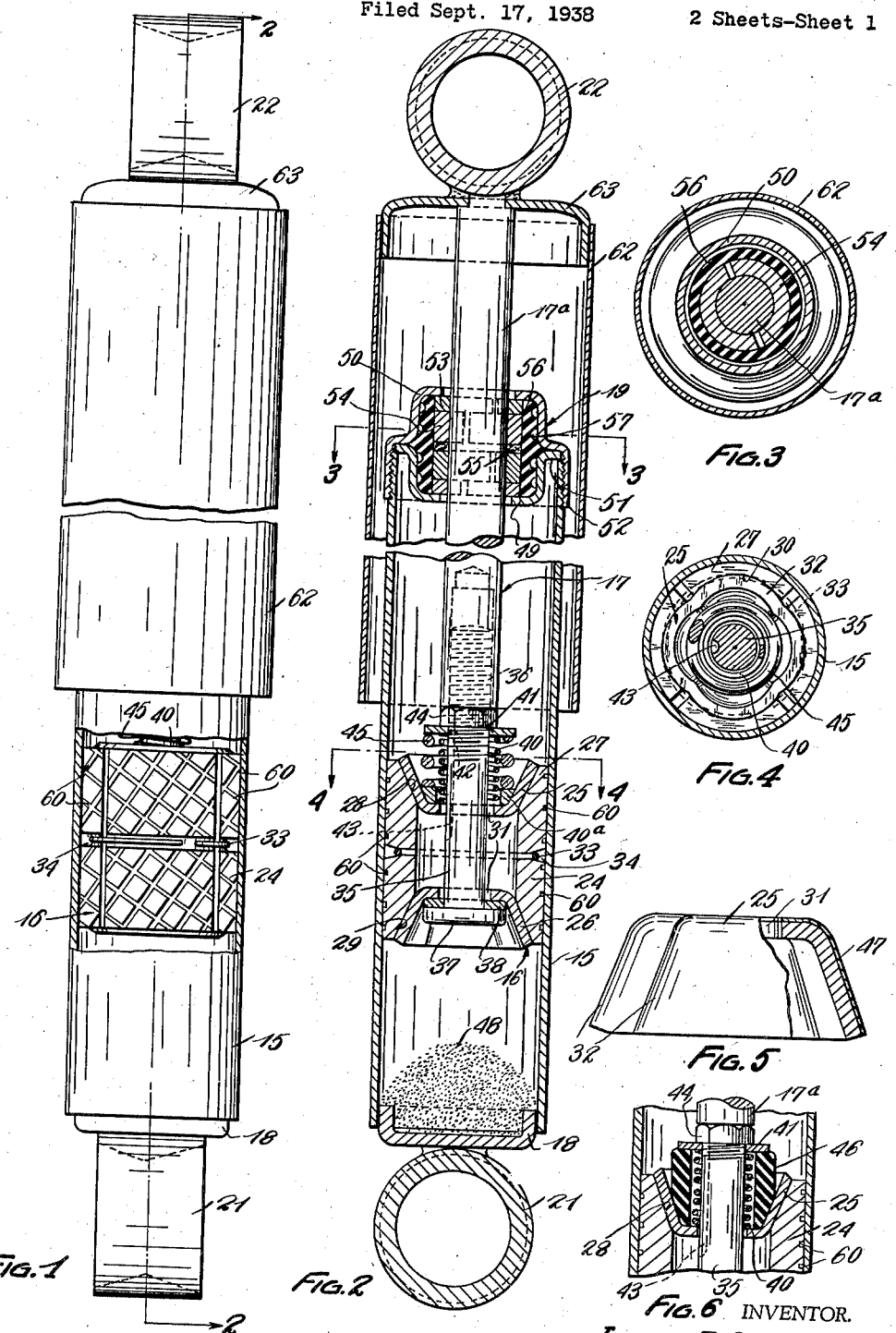
INVENTOR.
JACOB R. SNYDER
BY
ATTORNEYS

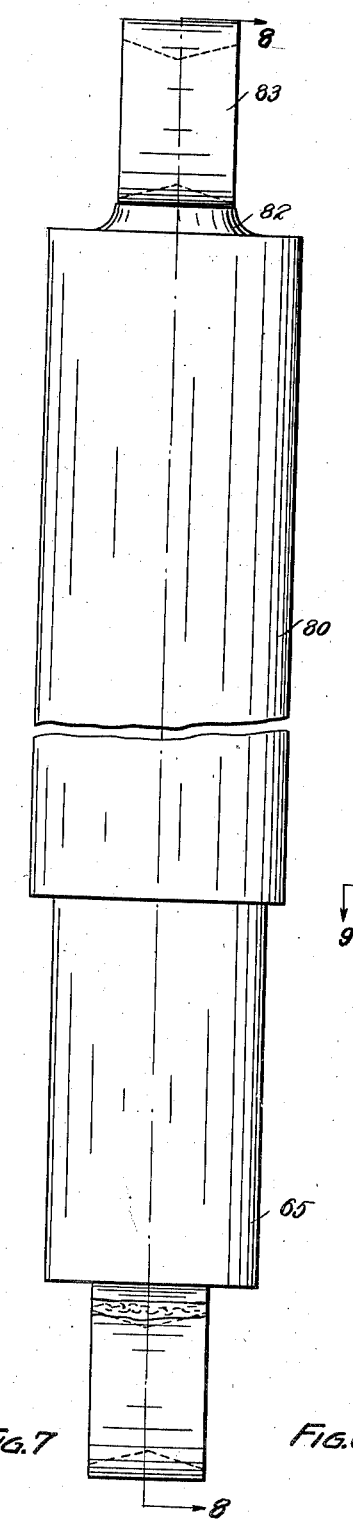
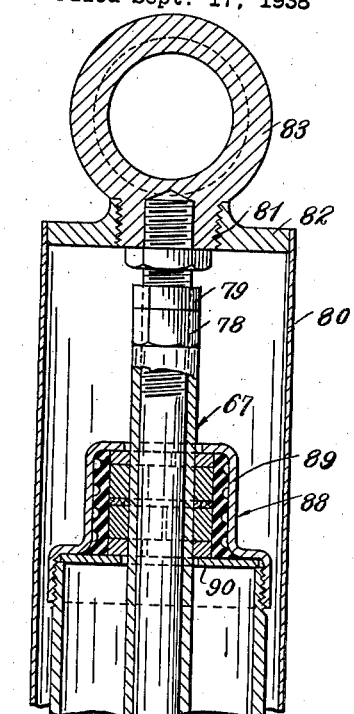
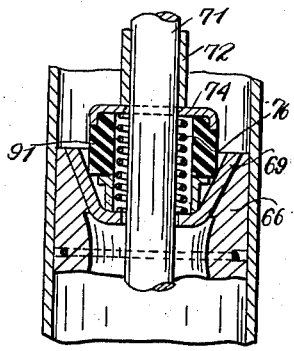
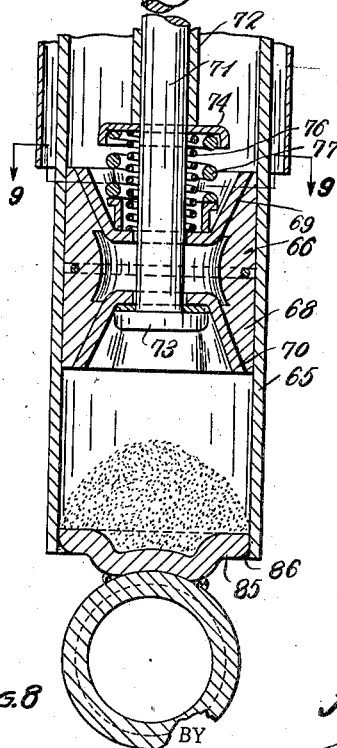

Patented Apr. 8, 1941

2,237,318

UNITED STATES PATENT OFFICE 2,237,318

DIRECT ACTING FRICTION SHOCK ABSORBER

Jacob R. Snyder, Cleveland, Ohio, assignor to Thompson Products, Inc., Cleveland, Ohio, a corporation of Ohio Application September 17, 1938, Serial No. 230,469

14 Claims. (Cl. 188—129)

This invention relates to shock absorbers for motor vehicles and other uses and more particularly to an improved friction shock absorber of the direct acting type.

An object of my invention is to provide a direct acting friction shock absorber which possesses the advantages of direct acting hydraulic shock absorbers but which is free of the many disadvantages of such direct acting hydraulic shock absorbers.

Another object of my invention is to provide an improved friction shock absorber embodying a minimum number of parts and capable of being economically manufactured and which can be quickly mounted on a motor vehicle without need for costly and complicated linkage or other expensive accessory apparatus.

A further object of my invention is to provide an improved friction shock absorber which will have highly desirable operating characteristics under all conditions and throughout a long period of use thus eliminating the need for frequent adjustment or replacement of parts and affording a smooth and efficient shock absorbing function in which the resistance developed in the device is substantially proportional to the severity of the road shock to be cushioned.

Still another object of my invention is to provide an improved friction shock absorber having therein a lubricating and film forming powder through the use of which important advantages are obtained including a high resistance to wear of the moving parts and a shock absorber action substantially unaffected by temperature changes.

Yet another object of my invention is to provide an improved direct acting friction shock absorber embodying a friction unit or piston of novel form.

Other objects and advantages of my invention will be apparent from the following description when taken in conjunction with the accompanying sheets of drawings in which:

Fig. 1 is an elevational view showing a friction shock absorber constructed according to my invention and with portions of the casing broken away to expose the friction unit or piston to view;

Fig. 2 is a longitudinal sectional view taken through the shock absorber as indicated by line 2—2 of Fig. 1;

Fig. 3 is a transverse sectional view taken through the device adjacent its upper end as indicated by section line 3—3 of Fig. 2;

Fig. 4 is a transverse sectional view taken through the device at a point just above the friction unit as indicated by line 4—4 of Fig. 2;

Fig. 5 is a detached elevational view partly in section showing one of the expanders of the friction unit;

Fig. 6 is a partial longitudinal sectional view showing a modified construction for the friction unit or piston;

Fig. 7 is an outside elevational view showing another friction shock absorber embodying my invention;

Fig. 8 is a longitudinal sectional view taken through such shock absorber as indicated by line 8—8 of Fig. 7;

Fig. 9 is a transverse sectional view taken through the shock absorber as indicated by line 9—9 of Fig. 8; and Fig. 10 is a partial longitudinal sectional view taken through a shock absorber similar to that of Fig. 8 but showing a modified construction for the friction unit or piston.

My improved shock absorber comprises, in general, an elongated tubular casing or cylinder 15 and a friction unit or piston 16 which is reciprocable in the casing in frictional engagement with the wall thereof to produce a frictional drag or resistance. An actuating member or rod 17 is connected with the friction unit 16 for reciprocating the same and projects from the casing preferably at the upper end thereof.

The casing 15 may be a section of metal tubing of appropriate size and length which is closed at its lower end by means of a cap 18 and at its upper end is provided with a combined rod bearing and sealing member 19 through which the actuating rod 17 extends. The cap 18 may be a cup-shaped sheet metal member telescoping with the lower end of the tubing and connected thereto by welding or other appropriate means. This cap may have a ring or eye 21 connected thereto by welding or other means and providing for attachment of the lower end of the shock absorber with the bracket or vehicle axle to which the lower end of the shock absorber is to be attached.

For attachment of the upper end of the shock absorber with the vehicle frame or other available member I provide a similar eye or ring 22 which may be connected with the upper end of the actuating rod 17 by welding or other suitable connecting means. It will be understood of course that during use of my improved direct acting shock absorber the eyes 21 and 22 are connected respectively with the relatively movable parts to be cushioned or checked, such as the axle and frame of a motor vehicle, and that relative movement between such parts resulting from flexing of the springs of the vehicle, as during travel over a rough or wavy road, will cause reciprocation of the rod 17 and of the friction unit 16 in the casing 15. The frictional drag between the unit 16 and the wall of the casing 15 will provide the desired shock absorbing resistance.

The friction unit or piston 16 constitutes an important part of my improved shock absorber and as shown in the drawings, this unit may comprise an expansible and contractible friction element 24 and a pair of expanders 25 and 26 which act on the friction element to expand the same. The friction element 24 may be in the form of a hollow member or sleeve composed of relatively movable sections or segments 27. In this instance the sleeve is split longitudinally and comprises four such sections or segments which are of similar size and shape. The sections or segments constituting the friction element 24 may be molded or otherwise constructed and may be formed of composition, metal or any other suitable material, but is preferably formed of a composition having the quality of being highly resistant to wear.

For expanding the friction element 24 against the wall of the casing 15 I provide the sleeve, or the segments thereof, with oppositely tapered surfaces 28 and 29 adjacent its ends and with which the expanders 25 and 26 cooperate respectively. To provide for a more efficient and improved cooperation between the expanders and the sleeve as will be presently explained, I prefer to construct the segments 27 so that their tapered portions have longitudinally extending transversely curved lobe-like recesses 30 therein. As can be readily seen from the drawings, the radius of curvature of the recesses 30 is shorter than the radius of curvature of the outer working or friction face of the segments.

The expanders 25 and 26 cooperate with the oppositely tapered portions of the segments for wedging the same outwardly and thereby radially expanding the sleeve constituting the friction element 24. For this purpose the expanders are also constructed with oppositely tapered or beveled surfaces which slidably cooperate with the tapered or beveled surfaces of the sleeve. These expanders may be in the form of cup-like sheet metal stampings and may be provided with openings 31 in their transverse walls for mounting the same on the actuating rod. To obtain the above-mentioned more efficient and improved cooperation between the sleeve and the expanders, I preferably construct the latter so that the tapered skirt portions thereof have annularly spaced arcuate lobes or eccentric portions 32 corresponding with the tapered lobe-like recesses 30 of the sleeve segments and which engage in such recesses as shown in Fig. 4. The provision of the tapered arcuate lobes 32 on the expanders and the tapered arcuate recesses 28 on the segments, in which they slidably and wedgingly engage, constitutes an important feature because the lobes not only hold the segments in the desired uniform annularly spaced relation, but a full surface contact of extensive area is maintained at all times during the relative sliding which occurs between the lobes and segments and I thus avoid the rapid wear which has heretofore resulted at this point in those devices where a line or point contact occurs between the expander and the segments.

For contracting the friction unit or piston 16 to reduce the frictional drag on the wall of the casing, I provide contracting or retracting means, preferably in the form of an annular wire spring 33 which extends around the friction element 24 as shown in Figs. 1 and 2. The segments of the friction element 24 may have an annular groove 34 formed in their outer or working face for accommodating this annular spring. In addition to serving as a contracting means for the segments 27, this spring also serves to hold the segments together in the form of a sleeve which greatly facilitates the handling and assembling of the friction element 24 and of the unit 16.

The friction unit 16 may be connected with the actuating rod 17 in various ways but is preferably mounted on the rod in a manner to permit adjustment of its expansion and operating characteristics. To this end I construct the actuating rod with a main section 17a which operates in the bearing and sealing member 19 and with an adjustable section 35 at its inner end. The rod section 35 may be in the form of a bolt which extends through the openings 31 of the expanders 25 and 26 and is screwed into a threaded opening 36 provided in the inner end of the main rod section 17a. The head 37 of the bolt provides a shoulder or abutment at the inner end of the actuating rod which is engaged by the expander 26. If desired a suitable washer or spacer 38 may be interposed between the head and the expander.

For causing the expanders 25 and 26 to exert an initial pressure against the segments of the sleeve or friction element 24 tending to expand the same, I provide a spring 40 on the rod section 35 and which bears against the expander 25 or a washer 40a interposed therebetween. A washer 41 forms an opposing abutment or plate against which the spring 40 also bears. This washer may have a lug or tongue 42 thereon engaging in a longitudinal groove 43 of the rod section 35 so as to permit longitudinal movement of the washer but preventing relative rotation thereof. This permits the washer 41 to be used as a means for rotating or holding the rod section 35 when the latter is to be adjusted relative to the rod section 17a for varying the compression of the spring 40. A nut 44 engaging the threaded portion of the rod section 35 serves as a jamb nut which engages the lower end of the rod section 17a for locking the rod sections together when the desired adjustment of the spring 40 has been obtained. This nut also forms a shoulder or abutment for limiting the outward or longitudinal shifting of the washer 41.

The spring 40 tends to cause the expanders 25 and 26 to be shifted toward each other and axially of the rod section 35 whereby an initial wedging pressure is exerted on the tapered portions of the friction element 24 tending to expand the segments thereof. This initial expansion of the friction unit 16 provides for a light frictional drag between this member and the casing 15 which will be effective for damping the action of the vehicle springs when traveling at relatively low speeds or over a wavy road surface. This initial frictional drag also provides a constantly acting resistance tending to hold the friction unit against longitudinal shifting in the casing 15 and which insures the accomplishment of a desired expansion of the friction unit by the expanders whenever sudden relative movement occurs between the actuating rod 17 and the casing. In other words, the initial frictional drag between the friction unit and the casing tends to hold the friction unit stationary so that its segments will be wedged outwardly by the expanders upon the occurrence of sudden relative movement between the actuating rod and casing. This results in an expanding of the friction unit and a "build-up" in the frictional drag to a degree substantially proportional to the severity of the road shocks occurring during the relatively higher speed travel of the vehicle. It will be understood of course that the greater the wedging action by which the sleeve or segments of the friction unit are pressed against the casing the greater will be the frictional drag and the resistance developed by the shock absorber.

In addition to the spring 40 which causes the initial frictional drag between the member 16 and the casing I may provide a resilient buffer member which controls and regulates the rate and degree of build-up of the frictional resistance or drag during the ordinary operation of the shock absorber. This buffer member may be in the form of a compression spring 45 which is relatively stiff as compared with the spring 40. The spring 45 is preferably not placed under initial compression during the adjustment of the rod section 35 and the compression of the spring 40 and is ineffective until a sudden road shock is encountered tending to cause relative shifting between the expanders and the friction element 24. The spring 45 opposes such relative movement and thus prevents the expanders from exerting an undue sudden wedging action on the segments of the friction element which might otherwise result in a seizing or grabbing of the friction unit 16 on the wall of the casing.

Instead of using a spring for the resilient buffer just referred to I may employ a rubber ring or bushing 46 for this purpose as shown in Fig. 6 of the drawings. When such a rubber ring or bushing is employed it will be understood of course that the rubber should be of the proper quality and durometer so as to withstand the flexing to which it may be subjected.

I desire it to be understood that the taper or bevel provided on the cooperating portions of the expanders and the friction element of the unit 16 may be varied, that is, the bevel angle may be greater or less than the particular bevel angle shown in the drawings, depending upon the characteristics of the vehicle springs and upon the particular shock absorbing action desired. Likewise, if desired, the bevel or taper on one expander and on the corresponding end of the friction element may be different from the bevel or taper on the other expander so that a substantially different frictional drag or resistance can be obtained for one stroke than for the opposite stroke. Although the taper or bevel is shown in Fig. 2 as the same for both expanders 25 and 26, I wish to explain that a different frictional drag or resistance as between the compression and rebound strokes is nevertheless obtainable during certain conditions of operation. First let it be explained, however, that during relatively low speed travel of the vehicle, or in response to road shocks causing comparatively slow relative movement between the unit 16 and the casing 15, the frictional drag of the unit on the casing results mainly from the action of the expanders under the influence of the initial compression adjustment of the spring 40 and hence the frictional drag or shock absorbing resistance will be substantially the same for both compression and rebound strokes. During higher speed travel of the vehicle, or in response to road shocks causing a high frequency or comparatively rapid relative movement between the unit 16 and the casing, the force applied to the expanders causes the same to move relative to the segments to further expand the friction unit. On the compression stroke this force is particularly cushioned or absorbed by the springs 40 and 45 but on the rebound stroke the force is transmitted directly to the expander 26 by the head 37 of the actuating rod 17. From this it will be seen that during the last mentioned condition of vehicle operation, and assuming that the expanders are of substantially the same taper angle, the resistance developed in my shock absorber on the rebound stroke will exceed the resistance developed on the compression stroke.

I find it desirable to provide for a relatively low coefficient of friction between the expanders and the friction element 24 so that expansion of the latter will readily take place when relative movement occurs between the actuating rod and the casing. To this end I may construct the expanders 25 and 26 so that the working faces thereof which wedgingly engage the tapered faces of the friction element have a smooth or polished surface characteristic. This may be obtained by coating the working face of the expanders with a layer 47 of vitreous enamel, or equivalent substance, having an inherently smooth or polished surface characteristic. The surface characteristic thus provided on the working faces of the expanders may be conveniently referred to as being of glass-like smoothness.

To further improve the operating characteristics of my shock absorber I provide a quantity of powder 48, preferably of dust-like fineness, in the shock absorber casing which accomplishes several important functions. One function of this powder is that of a lubricant which reduces the coefficient of friction between the expanders and the friction element 24 so that impulses applied to the actuating rod in either direction will immediately cause expansion of the friction unit to an extent substantially proportional to the force magnitude of such impulses. The powder is very effective in the accomplishment of this function, particularly when the expanders are provided with the vitreous enamel coating 47.

Another function of the powder is to form a coating or film on the moving or sliding parts of the shock absorber and thereby imparting to such parts a surface characteristic which is highly resistant to wear. During the reciprocation of the friction unit 16 in the casing the powder is violently agitated and is maintained in suspension in the air contained in the casing. Because of the turbulence and agitation to which the powder, or air and powder mixture, is subjected, the powder will fill the various crevices and interstices and will contact all surface portions of the various parts contained in the casing with the result that the powder will lubricate all of the sliding or moving surfaces and will form a wear resistant film or coating on such surfaces. I find that the presence of such a powder in the casing reduces the wear on the friction element 24 to the extent that the segments of the friction element will not require adjustment or replacement until after many thousands of miles of vehicular service.

Still another important function of the powder is that it substantially eliminates variation in the shock absorbing action due to temperature changes which, in hydraulic shock absorbers, has been a very troublesome factor. The powder coating or film which is deposited on the working surfaces imparts to such surfaces a coefficient of friction which is substantially constant for all temperatures and conditions of shock absorber operation. By thus eliminating temperature effects I secure a smooth action without any tendency toward seizing or binding of the friction member in the casing.

As the powder 48 to be used in the shock absorber casing for the purposes just mentioned and suitable coating and lubricating powder may be used which will produce the desired results above indicated, one or more such powders being now commercially available.

The member or unit 19 forms a closure for the upper end of the casing 15 as mentioned above and in addition forms a bearing for the actuating rod 17 as well as a seal which prevents the escape of the powder or the entry of dust or the like around such actuating rod. The member 19 may comprise a pair of oppositely dished cup-shaped sheet metal members 49 and 50 having openings accommodating the actuating rod 17 and which cooperate to form a chamber in which the packing and bearing elements are housed. The cup member 49 may have a lateral annular flange 51 which seats against the outer end of the tube and the cup member 50 may have a sleeve portion 52 having threaded connection with the casing 15 for mounting the bearing and closure member 19 thereon.

The member 19 may also include pairs of wear resisting rings 53 and 54 which surround the actuating rod 17 and provide a bearing therefor. Each of the rings 53 and 54 may be formed of two complementary semicircular sections as shown in Figs. 2 and 3, the sections of the rings 53 preferably being formed of bronze or some other suitable alloy or oil-less metal and the sections of the rings 54 preferably being formed of a wear resisting metal or a wear resisting composition. The sections forming the rings 53 and 54 are preferably assembled so that the joints of the adjacent rings will be broken or staggered and the joints between the rings 54 may be further broken by providing a leather washer 55 or the like therebetween.

The bearing rings 53 and 54 may be mounted directly in the casing formed by the cup-shaped members 49 and 50, but I prefer to mount them in a hollow body or bushing 56 formed of soft rubber or other suitable resilient material. This soft rubber body or bushing forms a yielding and cushioning support for the bearing rings and permits limited rocking or shifting of such rings whereby a self-aligning action for the rod bearing is obtained. The rubber body 56 is preferably of a size and shape such that when the cup members 49 and 50 are brought to their assembled or relative position shown in Fig. 1, the rubber is squeezed or compressed into the chamber defined by such cup members. The rubber being under more or less compression thus exerts a pressure on the sections of the rings 53 and 54 and presses them firmly against the actuating rod 17. To provide for compression of the rubber in the cup members 49 and 50 for the purpose just explained without the need for accurately determining the exact volume of rubber required it may be desirable to form the rubber body 56 with annular grooves or recesses 57 in its outer surface affording clearance spaces into which excess rubber may flow.

During the reciprocation of the friction unit or piston 16 in the casing the rod 17 extends more or less into the casing and causes repeated change in the volume of the casing or cylinder. As the rod moves into the casing its displacement tends to cause air to be forced out through the closure and bearing member 19 and withdrawal of the rod from the casing creates a partial vacuum tending to cause air to enter the casing through the member 19. I find that the member 19 forms an effective seal which minimizes the passage of air into or out of the casing around the rod 17 and effectively prevents the loss of powder as well as the entry of moisture or road dust.

It will also be seen that during the reciprocation of the friction unit 16 in the casing there is a displacement of the air, or air and powder mixture, from one side of such member to the other. To enable this transfer of air to take place readily without material compression thereof or causing hissing or other objectionable noises, I construct the friction unit 16 so that the spaces between the various parts thereof, such as the spaces between the adjacent segments 27 will provide an ample space or passage for the free transfer of such air, or air and powder mixture. In addition to such existing spaces between the parts of the friction unit 16, I may construct the segments 27 with grooves 60 in their outer or working face. These grooves may be in any desired pattern or arrangement such as the criss-cross arrangement shown in Fig. 1. In addition to forming an air space or passage for the transfer of air from one side of the friction unit to the other, the spaces between the various parts and the grooves 60 enable the powder to be more uniformly or thoroughly distributed to all of the various surface portions of the friction unit.

My shock absorber may be provided with a tubular shield 62 which is carried by the actuating rod 17 and telescopes the upper end of the casing 15. This shield may comprise a tube section of appropriate length and a cap 63 which forms an airtight closure for the upper end of such tube section and also provides a means for connecting the shield with the actuating rod and the eye 22 as by welding or other suitable connecting means. The shield 62 prevents dust, water or other foreign matter from being splashed or thrown against the upper portion of the casing or against the actuating rod. The airtight construction provided at the upper end of the tubular shield results in a pumping action being produced between the shield and the upper end of the casing whereby an outwardly flowing air blast is created between the shield and the casing tending to prevent dust or other foreign matter from entering the lower end of the shield.

In Figs. 7 to 9, inclusive, I have shown another embodiment of my improved direct acting friction shock absorber which in construction and principle of operation is similar to the shock absorber shown in Figs. 1 and 2. The shock absorber of Figs. 7 and 8 differs from that of Figs. 1 and 2 primarily in the construction and arrangement of the means for adjusting the initial expansion of the friction unit. In the device shown in Figs. 1 and 2, adjustment of the expansion of the friction unit, that is adjustment of the initial compression of spring 40, can be made only by dismounting the shock absorber and opening the casing thereof. This manner of adjustment may be desirable for the discouragement of unskilled persons inclined to tinker with the shock absorber. In the shock absorber of Figs. 7 and 8, however, the adjustment for the expansion of the friction unit can be made from the exterior of the device and without dismounting the same from the vehicle. The arrangement of parts and the manner of accomplishment of this adjustment will presently be explained.

The shock absorber shown in Figs. 7 and 8 comprises a tubular casing 65 and a friction unit 66 which is adapted to be reciprocated therein by means of an actuating rod 67. The friction unit 66 is of similar construction to the friction unit 16 and comprises an expansible segmental sleeve or friction element 68 having oppositely tapered lobe-like recesses therein adjacent its opposite ends and a pair of oppositely tapered lobular expanders 69 and 70 which exert a wedging action on such segments for expanding the friction unit. The actuating rod 67 may comprise a rod section or shaft 71 and a sleeve or tubular rod section 72 surrounding the same. A head 73 on the inner end of the rod section 71 forms an abutment or shoulder for the expander 70 and a plate or washer 74 engaging the inner end of the tubular rod section 72 forms an opposing abutment. Springs 76 and 77 disposed between the plate 74 and the expander 69 correspond as to purpose and function with springs 40 and 45 of the shock absorber of Fig. 2.

For the purpose of adjusting the compression of the spring 76 I provide the rod section 71 with a threaded portion adjacent its outer end and also provide the tubular rod section 72 with an internally threaded nut portion 78 adjacent its outer end which has screw connection with the threaded portion of the rod section 71. By rotation of the tubular rod section 72 relative to the rod section 71 it will be seen that the position of the plate 74 with respect to the head 73 can be varied to thereby vary the compression of the spring 76. A lock nut 79 cooperates with the nut portion 78 to lock the rod sections 71 and 72 together after the desired adjustment has been obtained.

To afford access to the nut portion 78 and the lock nut 79 without disconnecting the shock absorber from the vehicle I construct the dust shield 80 with a screw connection 81 between its cap portion 82 and the eye 83. When adjustment of the device is to be made the dust shield 80 is unscrewed from the eye 83 and lowered along the rod and with respect to the casing 65 so as to expose the nut portion 78 and the lock nut 79.

Instead of constructing the casing 65 with a telescoping cover at its lower end, as in Fig. 2, I may employ a plug or plate 85 which extends into the lower end of the casing and is retained therein by welding 86. Likewise, instead of constructing the closure and bearing member 88 at the upper end of the casing 65 with a pair of opposed cup members as in Fig. 2, I may provide only one cup member 88 and may employ a substantially flat plate or washer 90 in place of the second cup member.

Fig. 10 of the drawings shows a further modification in which a resilient bushing 91, formed of soft rubber or other suitable material, is used as a buffer in place of the spring 77.

From the foregoing description and accompanying drawings it will now be readily seen that I have provided a direct acting friction shock absorber which is of extremely simple construction and which will render efficient and reliable shock absorbing action throughout a long period of service. It will be seen further that this device will operate smoothly and quietly and that it can be built to a size which will permit it to be readily substituted in place of direct acting hydraulic shock absorbers.

While I have illustrated and described my improved direct acting friction shock absorber in a somewhat detailed manner it will be understood of course that I do not wish to be limited to the precise arrangements and constructional details herein disclosed but regard my invention as including such changes and modifications as do not constitute a departure from the spirit of the invention and the scope of the appended claims.

Having thus described my invention I claim:

1. A double acting friction shock absorber comprising a tubular casing, an actuating rod extending into the casing at one end thereof, an expansible sleeve shiftable longitudinally in the casing in frictional engagement with the wall thereof, and expanding means in the sleeve and connected with said rod and adapted to expand the sleeve upon relative longitudinal movement between the rod and casing in either direction, said sleeve comprising an annular series of segments having transversely curved longitudinally tapered recesses in the inner faces thereof and said expanding means having annularly spaced transversely curved longitudinally tapered lobe portions slidably engaging in the recesses of said segments.

2. A friction shock absorber comprising a cylindrical casing, an actuating member extending thereinto, and a friction unit in the casing adapted to be shifted by relative movement between the actuating member and casing, said friction unit comprising sections each provided with a transverse outer curvature corresponding substantially with the radius of curvature of the casing and a longitudinally tapered inner face curved transversely to a radius smaller than that of said outer curvature and an expander having longitudinally tapered lobes curved to said smaller radius and engaging said inner faces of the sections for expanding the unit.

3. In a direct acting friction shock absorber, a tubular casing, a sectional friction element reciprocable in said casing, an operating rod extending into the casing, a pair of expanders, said friction element having an annular series of tapered internal lobe-like recesses adjacent each end thereof and said expanders being mounted on the operating rod for cooperation with opposite ends of said friction element and having an annular series of tapered external lobe-like projections engaging in said recesses, and means on the rod cooperating with said expanders for locating the same at a position corresponding with a desired initial expansion of the friction element.

4. In a direct acting friction shock absorber, a tubular casing, a sectional friction element reciprocable in said casing, an operating rod extending into the casing, a pair of expanders on the operating rod adapted to act on opposite ends of the friction element for expanding the same, and means providing for an initial expansion of the friction element comprising a pair of spaced shoulders on the rod one of which is engaged by one of the expanders and a spring disposed between the other shoulder and the other expander.

5. In a direct acting friction shock absorber, a tubular casing, a sectional friction element reciprocable in said casing, a pair of expanders adapted to act on opposite ends of the friction element for expanding the same, an operating rod extending into the casing comprising a main rod section and a second section having adjustable connection therewith, means providing the rod with a shoulder for engagement with one of the expanders, a second shoulder spaced from the first shoulder, and a spring between the second shoulder and the other expander.

6. In a direct acting friction shock absorber, a tubular casing, an expansible friction unit operable in the casing, an actuating member connected with the friction unit for actuating the same comprising a rod and a surrounding sleeve projecting from the casing, a spring arranged in the casing so as to act on the friction unit and to be flexed upon relative axial movement between said rod and sleeve, and a connection between the rod and sleeve exteriorly of the casing for causing such relative axial movement and thereby adjusting the initial expansion of the friction unit to a predetermined setting.

7. In a friction shock absorber having a casing and an expansible friction element operable therein, and an expander element for the friction element adapted to expand the latter upon relative movement between cooperating portions of said elements, such portion of one of said elements having a vitreous enamel coating thereon imparting to such portion a polished surface characteristic.

8. In a friction shock absorber, a casing, an expansible friction element operable therein, and an expander for expanding the friction element in the casing, said expander having an inclined surface for wedging engagement with the friction element and a vitreous enamel coating on said inclined surface.

9. In a friction shock absorber, a tubular casing, a friction element operable in the casing comprising a plurality of sections each of which has a curved tapered recess therein, and a tapered expander engaging said element and having eccentric lobes engaging in the recesses of said sections.

10. A shock absorber comprising a tubular casing, an actuating member extending into said casing, a friction unit adapted to be reciprocated in the casing by relative movement between the actuating member and casing, and a lubricating powder loose in the casing adapted to be agitated to form a dust cloud in the casing upon reciprocation of the friction unit, said friction unit having one or more passages permitting a transfer of air and powder from one side of the friction unit to the other during reciprocation thereof.

11. In a friction shock absorber having a casing and an expansible friction element operable therein, an expander for the friction element having a vitreous enamel coating thereon, and a powder in the casing adapted to reduce the coefficient of friction between said element and expander.

12. A friction shock absorber comprising a casing, a friction element reciprocable therein, a rod extending into the casing for actuating the friction element, a powder loose in the casing adapted to be agitated to form a dust cloud in the casing and to form a film on working surfaces of the device, and closure means sealingly engaging said rod for retaining the powder in the casing, said friction element having one or more passages permitting a transfer of air and powder from one side of said friction element to the other during operation of the friction element in said casing.

13. In a direct acting friction shock absorber, a tubular casing, an expansible friction element reciprocable in the casing, an operating rod extending into the casing and having a shoulder thereon, an expander movable relative to the rod and adapted to cooperate with the friction element for expanding the same, a spring on the rod between said shoulder and expander acting to cause an initial expansion of the friction element, and a resilient buffer between said shoulder and expander.

14. In a friction shock absorber, a tubular casing, a friction element operable in the casing comprising a plurality of sections each of which has a curved tapered recess therein, and a tapered expander engaging said element and having curved tapered lobes engaging in the recesses of said sections, said lobes having thereon a coating imparting thereto a polished surface characteristic.

JACOB R. SNYDER.